Sept. 3, 1946.  C. F. COAKE  2,407,141
ELECTRIC MICROGAUGE SYSTEM
Filed Feb. 15, 1945  3 Sheets-Sheet 2
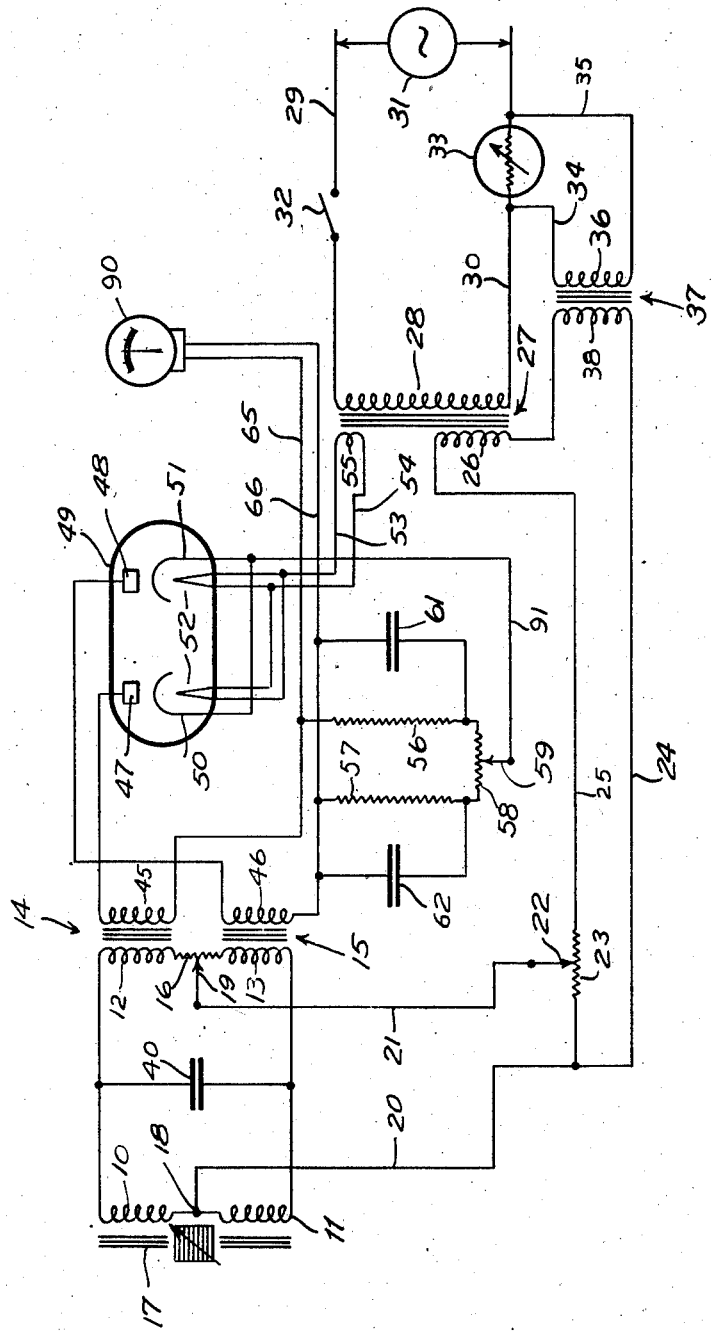
INVENTOR
CHARLES F. COAKE
BY
ATTORNEY Sept. 3, 1946.    C. F. COAKE    2,407,141
ELECTRIC MICROGAUGE SYSTEM
Filed Feb. 15, 1945    3 Sheets-Sheet 3
Fig. 3.
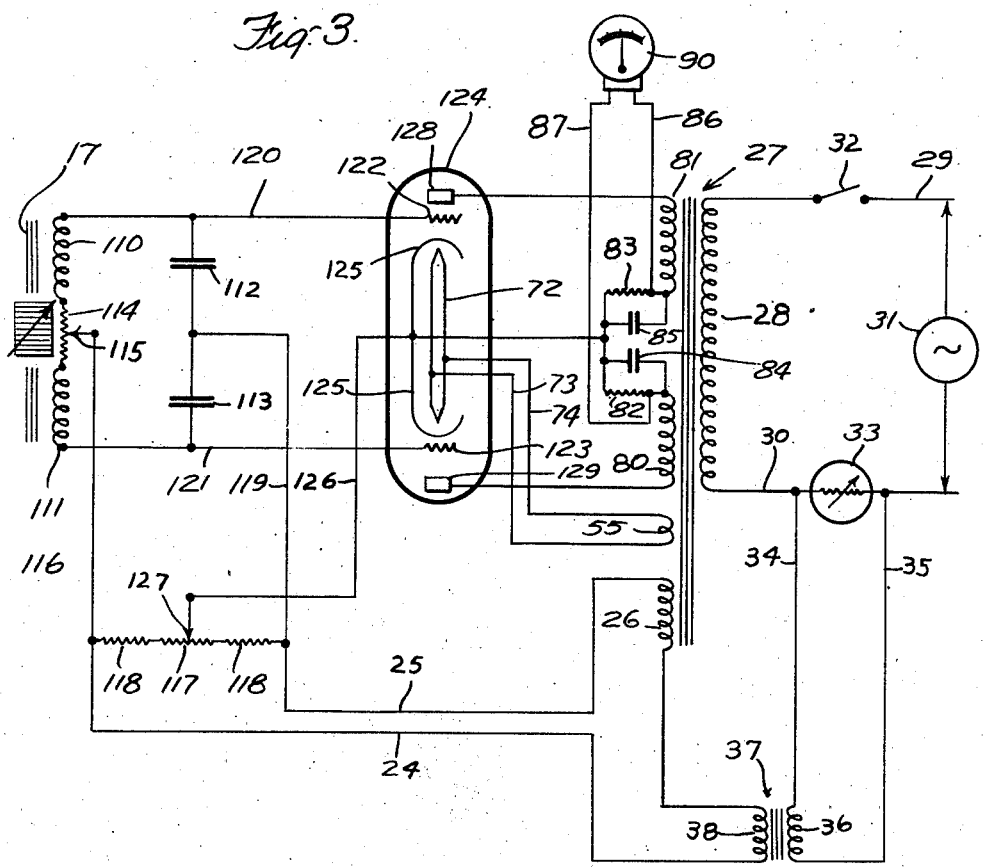
Fig. 4.
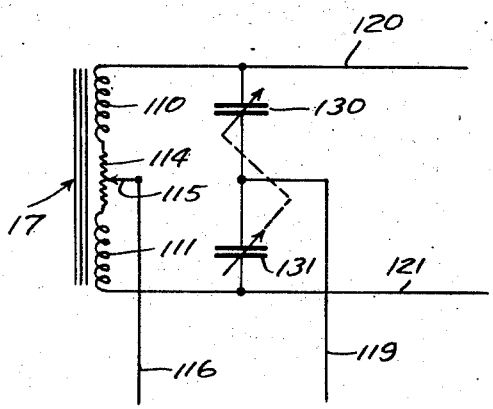
INVENTOR
CHARLES F. COAKE
BY
ATTORNEY Patented Sept. 3, 1946

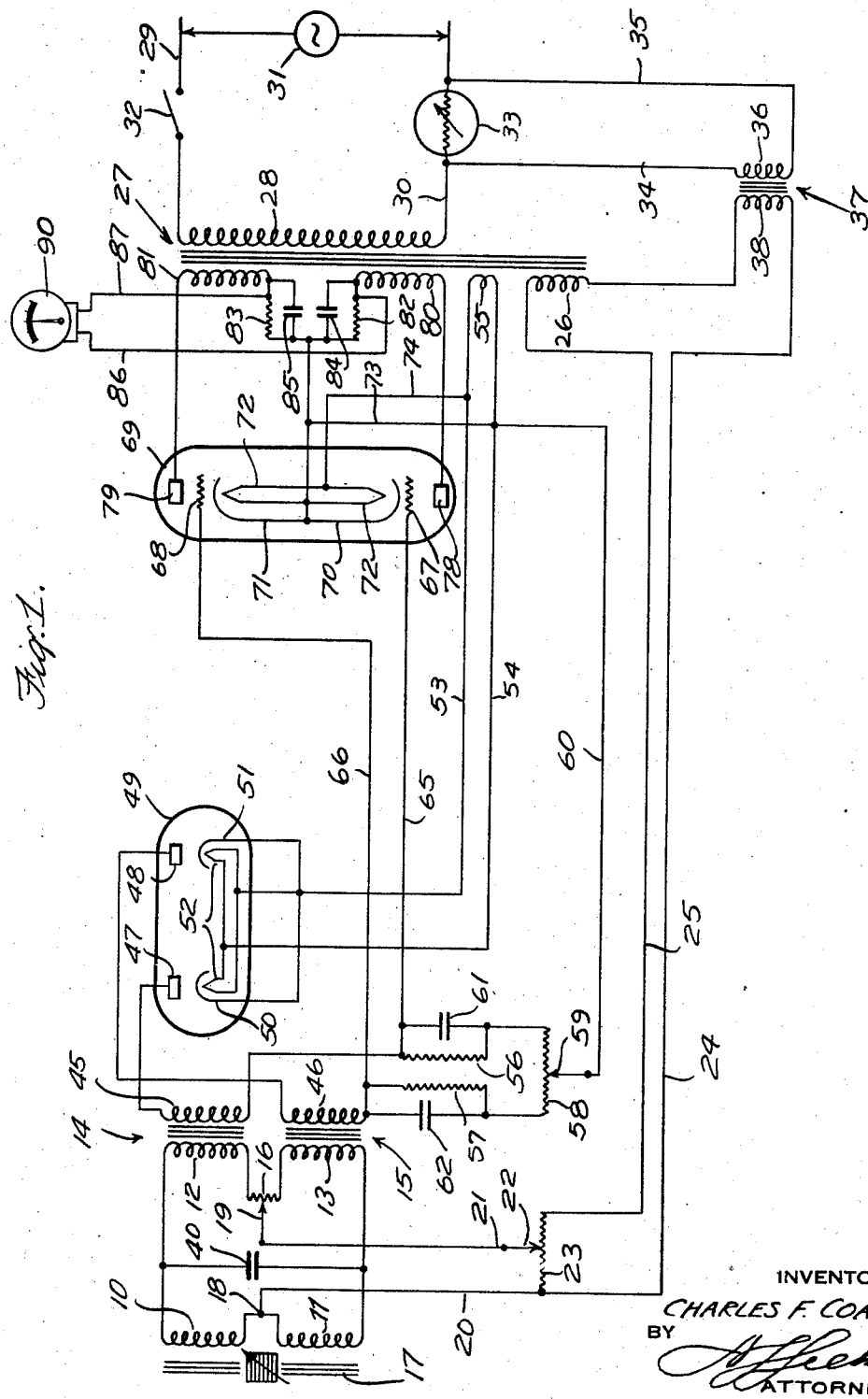

2,407,141

UNITED STATES PATENT OFFICE 2,407,141

ELECTRIC MICROGAUGE SYSTEM

Charles F. Coake, Indianapolis, Ind., assignor to Senn Corporation, New Augusta, Ind., a corporation of Indiana Application February 15, 1945, Serial No. 578,074

10 Claims. (Cl. 177—351)

This invention relates to electric microgauges of the type including a variable impedance device the impedance of which is varied in accordance with the quantity to be measured, and more particularly to a novel and improved system for actuating an instrument in response to such changes in impedance.

This application is a continuation in part of my co-pending application Ser. No. 548,281, filed Aug. 5, 1945, for Micro-limit indicating system.

An object of the invention is to provide a system of the above type having novel and improved operating characteristics.

Another object is to provide a system of the above type which is extremely sensitive to minor changes in impedance of the variable impedance device.

Various other objects and advantages will be apparent as the nature of the invention is more fully disclosed.

In accordance with one embodiment of the invention a pair of variable impedance devices are connected to constitute two adjacent legs of a bridge circuit, the other two legs of which constitute fixed impedances. An alternating voltage is applied across one diagonal of the bridge and the voltage to be measured is taken from across the other diagonal. The bridge circuit is made resonant or nearly resonant at the frequency of the applied voltage. In the case of an inductance bridge a tuning condenser is connected across the bridge or condensers are connected in the various legs of the bridge so as to form series or parallel resonant circuits when the variable impedances have a predetermined value. Any alteration in the value of these variable impedances will alter the tuning of the bridge and will cause a corresponding change in the current distribution therein.

A resonant bridge of the above type is extremely sensitive to changes in impedance because with a fixed input voltage, the output voltage rises rapidly as resonance is approached and falls rapidly as the values of the impedances are changed to depart from resonant conditions. Hence, a minor change in the value of the impedances when the bridge is operating at or near the point of resonance produces a greatly increased change in the output voltage across the bridge. This voltage change is applied to a measuring circuit which actuates an indicating instrument.

The measuring circuit may include balanced rectifiers with an indicator connected to be actuated by the differential effect of the currents passing through the two rectifiers. If a more sensitive response is desired the outputs of the rectifiers may be fed to amplifiers and the indicator may be connected to the output circuits of the amplifiers.

Although the novel features which are believed to be characteristic of this invention are pointed out more fully in the claims, the invention will be better understood by referring to the following description, taken in connection with the accompanying drawings in which certain specific embodiments thereof have been set forth for purposes of illustration.

In the drawings,

Fig. 1 is a schematic diagram of a microgauge circuit embodying the present invention;

Fig. 2 is a schematic diagram of a similar circuit illustrating an embodiment of the invention in which the amplifier is omitted.

Fig. 3 is a schematic diagram of a similar circuit illustrating a modified form of bridge; and Fig. 4 is a schematic diagram of a bridge having variable capacity legs.

Referring to Fig. 1, the bridge is shown as comprising a pair of variable impedance coils 10 and 11 and the primaries 12 and 13 of transformers 14 and 15 respectively, connected in series to form the four legs of a bridge circuit with a zero set potentiometer 16 connected in series between the primaries 12 and 13. The coils 10 and 11 are associated with an armature 17 the position of which may be varied by a measuring stylus (not shown) so as to vary the impedance of the coils 10 and 11 in an opposite sense.

An alternating current of fixed frequency is supplied to a point 18 intermediate the coils 10 and 11 and to the adjustable tap 19 of the potentiometer 16 by lines 20 and 21 which are connected respectively to one side and to the adjustable tap 22 of a potentiometer 23. In the case of coils using an iron core, a low frequency within the limits of the characteristics of the core may be used. For commercial reasons the coils may be designed for a frequency of 60 cycles. If air core coils are used a high frequency may be preferred. The potentiometer 23 is connected by lines 24 and 25 across a secondary 26 of a multiple secondary power transformer 27 having a primary 28 connected by lines 29 and 30 to a source 31 of alternating current of predetermined frequency. A switch 32 is provided to control the operation of the system and a positive temperature co-efficient resistor such as a lamp 33 is connected in series with the line 30 to develop a voltage suitable for compensating for variations in line voltage. The voltage across the resistor 33 is supplied by lines 34 and 35 to the primary 36 of a compensating transformer 37 having a secondary 38 connected in series with the secondary 26 of the power transformer 27 in a sense to introduce a voltage suited to compensate for voltage fluctuations in the secondary 26 due to variations in line voltage.

A tuning condenser 40 is connected across one diagonal of the bridge and is shown as connected across the primaries 12 and 13 and across the coils 10 and 11 in parallel. This tuning condenser is chosen to form with the inductances 10, 11, 12 and 13 circuits which are resonant or nearly resonant at the frequency of the current supplied to the bridge from the transformer 27.

Due to the resonant conditions of the circuits, the condenser 40 also serves to correct the wave form inasmuch as the current in a resonant circuit operating under conditions of resonance tends to take a sine form regardless of the shape of the applied wave.

The output transformers 14 and 15 are provided with secondaries 45 and 46 which are connected respectively to anodes 47 and 48 of a double diode rectifier tube 49. The rectifier tube 49 is provided with cathodes 50 and 51 heated by filaments 52 which are supplied by lines 53 and 54 from a second secondary 55 of the power transformer 27. The cathodes 50 and 51 are shown as connected to the filament supply line 53. The anode returns through the secondaries 45 and 46 are connected through resistors 56 and 57 respectively to the two sides of a potentiometer 58 having an adjustable tap 59 connected by a line 60 to the filament supply line 54, thereby introducing the potential developed by the secondary 55 as a biasing potential in the rectifier circuit. Resistances 56 and 57 are by-passed by suitable by-pass condensers 61 and 62 to eliminate the alternating current component from the voltage drop developed across the resistors by the rectified current.

The anode sides of the resistors 56 and 57 are shown as connected by lines 65 and 66 to control grids 67 and 68 respectively of a double triode amplifier tube 69. The tube 69 is shown as provided with cathodes 70 and 71 and with filaments 72 which are connected by lines 73 and 74 across the secondary 55 of the power transformer 27. The cathodes 70 and 71 are connected to the line 73 and thence by line 60 to the tap 59 of potentiometer 58.

The tube 69 is also provided with anodes 78 and 79 which are connected to third and fourth secondaries 80 and 81 respectively of the power transformer 27. The anode returns are connected through the secondaries 80 and 81 and resistors 82 and 83 respectively to the cathodes 70 and 71. Resistors 82 and 83 are shown as by-passed by suitable by-pass condensers 84 and 85. The anode sides of the resistors 82 and 83 are connected by lines 86 and 87 to an indicator 90 shown as a center indicating millivoltmeter.

*Operation*

It will be noted that the bridge comprises two series resonant circuits. One circuit includes the coil 10, condenser 40, primary 13, line 21, potentiometer 23 and line 20 to the coil 10. The other circuit includes coil 11, condenser 40, primary 12 and thence through line 21, potentiometer 23 and line 20 back to the coil 11. When the impedances of the coils 10 and 11 are equal the two circuits will have identical characteristics and equal currents will flow therethrough. Under these conditions the series resonant circuits are tuned to a point near but not exactly at resonance so that one circuit approaches resonance and the other circuit recedes from resonance in response to opposed variations in the impedance of the coils 10 and 11.

When equal currents pass through both primaries 12 and 13 the current supplied from the secondaries 45 and 46 to the two rectifier paths are also equal, and equal voltage drops are produced in resistors 56 and 57. These voltage drops are applied to the grids 67 and 68 of the double amplifier tube 69 and cause equal space currents to flow in the two anode circuits thereof. Hence the voltage drops across the output resistors 82 and 83 will be equal and the indicator 90 will indicate a zero potential.

When the impedances of the coils 10 and 11 are varied in an opposite manner in response to movement of the stylus one of the series resonance circuits is caused to operate nearer the point of resonance than the other circuit, thereby producing comparatively large changes in the current passing through the respective primaries 12 and 13 and causing currents of different values to be supplied from the secondaries 45 and 46 to the rectifier 49. The voltage drops through the resistors 56 and 57 then become unequal and cause unequal space currents to flow in the two space current circuits of the amplifier tube 69. Hence the voltage drops across the resistors 82 and 83 become unequal and an indication of the difference is obtained on the indicator 90. The indicator 90 may be graduated linearly so that equal increments of the indicator scale represent equal increments of movement of the stylus which actuates the armature 17.

The potentiometer 16 provides adjusting means for setting the bridge for equal currents in primaries 12 and 13 when the armature 17 is in mid position. This adjusting means compensates for the variations in the parts and may be set to give a zero indication on the meter 90. The potentiometer 23 provides means for adjusting the potential applied to the bridge and constitutes a sensitivity control, the sensitivity being greater when a greater potential is applied and vice versa. The potentiometer 58 provides means for adjusting the circuit to compensate for variations in the amplifier tubes and other elements so as to provide a zero indication on the indicator 90 in response to equal potential drops across the resistors 56 and 57.

The positive temperature co-efficient resistor 33 is designed to maintain a substantially constant voltage across the primary 29 of the transformer 27 regardless of minor variations in the supply voltage. The voltage supplied to the bridge, however, is further corrected by the transformer 37 which introduces in series with the voltage delivered by the secondary 26 of the transformer 27 a balancing potential which is proportional to variations in the voltage drop across the resistor 33. By a suitable selection of these elements it is possible to produce a substantially constant voltage input to the bridge. It is of course obvious that other types of voltage regulating transformers may be used for this purpose.

In the embodiment shown, amplification is introduced by the amplifier tube 69. It is understood, however, that in certain instances amplification may not be required, in which event lines 65 and 66 may be connected directly to the indicating instrument 90 as indicated in Fig. 2.

In the embodiment shown in Fig. 1, the rectifier tube 49 is biased by the voltage introduced by the secondary 55. If this bias is not required the cathodes 50 and 51 of the rectifier tube may be connected directly to the variable tap 59 of the potentiometer 58 by a lead 91 as indicated in Fig. 2. The connections in the embodiment of Fig. 2 are otherwise similar to those of Fig. 1 and the parts have been given corresponding reference characters. It is to be understood that the leads 65, 66 of Fig. 2 may be connected to the indicating instrument 90 as shown or may lead to an amplifier as in Fig. 1 if desired.

In the embodiment shown in Fig. 3, the bridge comprises variable impedance coils 110 and 111 and condensers 112 and 113 which are connected to form an inductance-capacity bridge. A zero set potentiometer 114, connected between the coils 110 and 111, is provided with an adjustable tap 115 which is connected by a line 116 to one side of a resistor assembly including fixed resistors 118 and a potentiometer 117. The other side of the resistor assembly is connected by a line 119 to the common point of the condensers 112 and 113. The resistors 118 prevent over control by the potentiometer 117.

The other sides of the condensers 112 and 113 are shown as connected by lines 120 and 121 respectively to grids 122 and 123 of a double triode amplifier tube 124 similar to the amplifier tube 69 of Fig. 1.

The tube 124 is provided with cathodes 125 which are connected by a line 126 to the tap 127 of the potentiometer 117. The tube 124 is also provided with anodes 128 and 129 which are connected to the secondaries 80 and 81 of the transformer 27 as in Fig. 1. The remaining parts of the circuit are similar to those in Fig. 1 and have been given corresponding reference characters.

In this embodiment the condensers 112 and 113 are of a value to form series resonance circuits with the coils 110 and 111 respectively so that when the impedances of the coils 110 and 111 are equal equal currents flow through the condensers 112 and 113 and equal potentials are applied to the grids 122 and 123. Any change in the impedances of the coils 110 and 111, however, changes the resonant condition of the circuits as in Fig. 1 and produces corresponding voltage changes across the condensers 112 and 113 which are amplified in the tube 124 to produce different voltage drops across the resistors 82 and 83 which are indicated on the indicating device 90.

In the embodiment of Fig. 4 the condensers 130 and 131 of the bridge are made variable and the coils 110 and 111 of fixed impedance. Otherwise the bridge circuit is similar to those above described and operates in the same manner. The condensers are arranged to be variable in opposite sense in response to movement of the stylus. Obviously both the coils and the condensers may be made variable if desired.

In the embodiments of Figs. 1 and 3 the plates are shown as supplied by A. C. However, a D. C. plate supply may be used if desired since the voltage differential is utilized for the indication.

The resonance bridge as described above has the advantage of increased sensitivity due to the large increase of current flowing therethrough at resonance. It is also less sensitive to changes in wave form of the applied current than are non-resonance circuits.

Although certain specific embodiments of the invention have been shown for purposes of illustration, it is to be understood that various changes and modifications may be made therein as will be readily apparent to a person skilled in the art. The invention is only to be restricted in accordance with the scope of the following claims.

What is claimed is:

1. An electric measuring system comprising inductive and capacity elements connected to form a bridge circuit, means supplying an alternating voltage of predetermined frequency across one diagonal of said bridge, said inductive and capacity elements being related to form a pair of circuits resonant at said frequency, a pair of output circuits connected respectively across a pair of like elements of said bridge to carry equal currents when said bridge is in balance near the point of resonance, means oppositely varying the reactance of a pair of like elements of said bridge in accordance with the quantity being measured to change the tuning of said resonant circuits and to produce a corresponding unbalance in the currents in said circuits, and means responsive to the unbalance between said currents.

2. An electric measuring system comprising inductive and capacity elements connected to form a bridge circuit, means supplying an alternating voltage of predetermined frequency across one diagonal of said bridge, said inductive and capacity elements being related to form a pair of circuits resonant at said frequency, a pair of output circuits connected respectively across a pair of like elements of said bridge to carry equal currents when said bridge is in balance near the point of resonance, means oppositely varying the reactance of a pair of like elements of said bridge in accordance with the quantity being measured to change the tuning of said resonant circuits and to produce a corresponding unbalance in the currents in said circuits, means producing voltage drops proportional to the respective currents and means connected to respond to the difference between said voltage drops.

3. An electric measuring system comprising inductive and capacity elements connected to form a bridge circuit, means supplying an alternating voltage of predetermined frequency across one diagonal of said bridge, said inductive and capacity elements being related to form a pair of circuits resonant at said frequency, a pair of output circuits connected respectively across a pair of like elements of said bridge to carry equal currents when said bridge is in balance near the point of resonance, means oppositely varying the reactance of a pair of like elements of said bridge in accordance with the quantity being measured to change the tuning of said resonant circuits and to produce a corresponding unbalance in the currents in said circuits, means rectifying the respective currents to produce corresponding direct potentials, and means connected to respond to the difference between said potentials.

4. An electric measuring system comprising inductive and capacity elements connected to form a bridge circuit, means supplying an alternating voltage of predetermined frequency across one diagonal of said bridge, said inductive and capacity elements being related to form a pair of circuits resonant at said frequency, a pair of output circuits connected respectively across a pair of like elements of said bridge to carry equal currents when said bridge is in balance near the point of resonance, means oppositely varying the reactance of a pair of like elements of said bridge in accordance with the quantity being measured to change the tuning of said resonant circuits and to produce a corresponding unbalance in the currents in said circuits, means rectifying the respective currents to produce corresponding direct potentials, an amplifier connected to amplify said potentials and means connected to said amplifier to respond to the difference between said amplified potentials.

5. An electric measuring system comprising inductive and capacity elements connected to form a bridge circuit, means supplying an alternating voltage of predetermined frequency across one diagonal of said bridge, said inductive and capacity elements being related to form a pair of circuits resonant at said frequency, a pair of output circuits connected respectively across a pair of like elements of said bridge to carry equal currents when said bridge is in balance near the point of resonance, means oppositely varying the reactance of a pair of like elements of said bridge in accordance with the quantity being measured to change the tuning of said resonant circuits and to produce a corresponding unbalance in the currents in said circuits, means rectifying the respective currents to produce corresponding direct potentials, space discharge amplifiers having control grids connected to receive said potentials and having plate circuits including resistors carrying the respective plate currents, and means connected to respond to the voltage difference across said resistors.

6. An electric measuring system comprising a pair of variable impedance coils, a pair of transformers having primaries connected in series with said coils to form a bridge circuit, means supplying an alternating voltage of predetermined frequency to the mid-points between said coils and between said primaries, a condenser connected across said coils and said primaries in parallel and adapted to form therewith a pair of circuits resonant at said frequency, means oppositely varying the impedance of said coils in accordance with the quantity being measured to change the tuning of said resonant circuits and to produce a corresponding unbalance between the currents in said primaries and means connected to said transformers to respond to the difference between said last currents.

7. An electric measuring system comprising a pair of variable impedance coils, a pair of transformers having primaries connected in series with said coils to form a bridge circuit, means supplying an alternating voltage of predetermined frequency to the mid-points between said coils and between said primaries, a condenser connected across said coils and said primaries in parallel and adapted to form therewith a pair of circuits resonant at said frequency, means oppositely varying the impedance of said coils in accordance with the quantity being measured to change the tuning of said resonant circuits and to produce a corresponding unbalance between the currents in said primaries, a pair of rectifiers connected to said transformers to produce direct potentials corresponding to said currents, and means connected to respond to the difference between said potentials.

8. An electrical measuring system comprising a pair of variable impedance coils, a pair of fixed impedances connected in series with said coils to form a bridge circuit, means supplying an alternating current of predetermined frequency across one diagonal of said bridge, means including said fixed impedances tuning said bridge to resonance at said frequency, means oppositely varying the impedance of said coils in accordance with the quantity being measured to produce a corresponding change in the currents in said fixed impedances, and output circuits connected to said fixed impedances having means responsive to the difference between the currents therein.

9. An electric measuring system comprising a pair of inductive elements and a pair of capacity elements connected in series to form a bridge circuit with the pairs of like elements in adjacent legs of said bridge, means supplying an alternating voltage of predetermined frequency to points of said bridge between the elements of each pair, a pair of output circuits connected respectively across a pair of like elements of said bridge to carry equal currents when said bridge is in balance, means oppositely varying the reactance of a pair of like elements of said bridge in accordance with the quantity being measured to produce an unbalance in the currents in said output circuits, each output circuit including a rectifier and a resistor connected to develop a unidirectional voltage drop proportional to the current in said circuit, amplifier means having input circuits connected to said resistors and having output circuits including series resistors, and indicating means connected to respond to the difference in voltage drops in said last resistors.

10. An electric measuring system comprising a pair of inductive elements and a pair of capacity elements connected in series to form a bridge circuit with the pairs of like elements in adjacent legs of said bridge, means supplying an alternating voltage of predetermined frequency to points of said bridge between the elements of each pair, a pair of output circuits connected respectively across a pair of like elements of said bridge to carry equal currents when said bridge is in balance, means oppositely varying the reactance of a pair of like elements of said bridge in accordance with the quantity being measured to produce an unbalance in the currents in said output circuits, each output circuit including a rectifier and a resistor connected to develop a unidirectional voltage drop proportional to the current in said circuit, a potentiometer connected between said resistors and having an adjustable tap, a common return lead connected to said tap whereby adjustment thereof may be effected for balancing said bridge, and means responsive to the difference in potentials across said resistors.

CHARLES F. COAKE.